United States Patent
Chen et al.

(10) Patent No.: US 10,991,271 B2
(45) Date of Patent: Apr. 27, 2021

(54) COAL MEASURES FAULT FORMATION SIMULATION EXPERIMENT DEVICE AND NORMAL AND REVERSE FAULT SIMULATION EXPERIMENT METHOD

(71) Applicant: SHANDONG UNIVERSITY OF SCIENCE AND TECHNOLOGY, Qingdao (CN)

(72) Inventors: Shaojie Chen, Qingdao (CN); Zhiyuan Li, Qingdao (CN); Xinyuan Zhang, Qingdao (CN); Zhiguo Xia, Qingdao (CN); Tianqi Jiang, Qingdao (CN); Jian Cui, Qingdao (CN); Dawei Yin, Qingdao (CN)

(73) Assignee: SHANDONG UNIVERSITY OF SCIENCE AND TECHNOLOGY, Qingdao (CN)

(*) Notice: Subject to any disclaimer, the term of this patent is extended or adjusted under 35 U.S.C. 154(b) by 0 days.

(21) Appl. No.: 16/756,701

(22) PCT Filed: Apr. 29, 2019

(86) PCT No.: PCT/CN2019/084936
§ 371 (c)(1),
(2) Date: Apr. 16, 2020

(87) PCT Pub. No.: WO2020/206759
PCT Pub. Date: Oct. 15, 2020

(65) Prior Publication Data
US 2021/0049934 A1    Feb. 18, 2021

(30) Foreign Application Priority Data
Apr. 8, 2019 (CN) .......... 201910274040.8

(51) Int. Cl.
*G01N 3/24* (2006.01)
*G01N 3/02* (2006.01)
(Continued)

(52) U.S. Cl.
CPC ............ *G09B 23/40* (2013.01); *B66F 3/25* (2013.01); *G01N 3/02* (2013.01); *G01N 3/24* (2013.01)

(58) Field of Classification Search
CPC ... G01N 2203/0066; G01N 2203/0048; G01N 3/02; G01N 3/12; G01N 2203/0064; G01N 2203/0019; G01N 33/24
See application file for complete search history.

(56) References Cited

U.S. PATENT DOCUMENTS

2020/0292419 A1* 9/2020 Yang ............. G05B 17/02

FOREIGN PATENT DOCUMENTS

CN    108956933 A  * 12/2018
CN    209764609 U  * 12/2019

OTHER PUBLICATIONS

International Search Report issued in corresponding International Application No. PCT/CN2019/084936, dated Jan. 9, 2020, the State Intellectual Property Office of the P.R. China, Beijing, China.
(Continued)

*Primary Examiner* — Brandi N Hopkins
(74) *Attorney, Agent, or Firm* — Hauptman Ham, LLP

(57) ABSTRACT

A coal measures fault formation simulation experimental device and a normal and reverse fault simulation experiment method relate to the field of similar material simulation experiment technology. The device includes a hydraulic lifting apparatus, a lower angle adjusting apparatus, a push rod apparatus, an upper loading apparatus, an upper angle adjusting apparatus, a lateral loading apparatus and a transparent side plate. The hydraulic lifting apparatus and the
(Continued)

lower angle adjusting apparatus are below the experimental body, the upper loading apparatus and the upper angle adjusting apparatus are above the experimental body, the transparent side plate is disposed at a rear side surface of the experimental body, and the lateral loading apparatus is disposed at an end face of the experimental body. When the normal fault is simulated with the device, the inclination angle of an inclined plate of the lower angle adjusting apparatus is same as that of an inclined push plate of the upper angle adjusting apparatus, the upper loading apparatus loads downward to form a normal fault.

7 Claims, 3 Drawing Sheets

(51) Int. Cl.
    *G09B 23/40*        (2006.01)
    *B66F 3/25*         (2006.01)

(56) References Cited

OTHER PUBLICATIONS

Written Opinion issued in corresponding International Application No. PCT/CN2019/084936, dated Jan. 9, 2020, the State Intellectual Property Office of the P.R. China, Beijing, China.
Chinese Search Report issued in corresponding Chinese Patent Application No. 2019102740408, dated Aug. 19, 2019.
First Office Action issued in corresponding Chinese Patent Application No. 2019102740408, dated Aug. 27, 2019.
Notification to Grant Patent Right for Invention issued in corresponding Chinese Patent Application No. 2019102740408.

* cited by examiner

COAL MEASURES FAULT FORMATION SIMULATION EXPERIMENT DEVICE AND NORMAL AND REVERSE FAULT SIMULATION EXPERIMENT METHOD

RELATED APPLICATIONS

The present application is a National Phase of International Application Number PCT/CN2019/084936, filed Apr. 29, 2019, and claims the priority of Chinese Application No. 2019102740408, filed Apr. 8, 2019.

TECHNICAL FIELD

The present disclosure relates to the field of similar material simulation experiment technology, and in particular to an indoor simulation experiment device for coal measures fault formation and a method of performing a normal and reverse fault simulation experiment with the device.

BACKGROUND

Tectonophysical simulation experiment is an important and effective method of studying geological structure as well as an important approach for geological workers to study a stratum deformation process and a fault formation mechanism. At present, a tectonic simulation experiment device used in a geological tectonic simulation is a device used to perform deformation experiment by controlling experimental model with motion or force based on similarity principle so as to simulate or retrieve geological origin of fault and so on. The device body mainly adopts experimental containers such as sand box. The tectonic formation process is simulated by paving a plurality of layers of experimental materials with different mesh numbers in the sand box to study origin and evolution mechanisms of the geological structure and perform qualitative and quantitative analysis for geological tectonic origin. The existing fault formation simulation experiment device can only simulate the formation of normal fault or reverse fault and cannot adjust a fault angle and a fracture initiation position. As a result, the geological workers are limited in analyzing the actual geological phenomenon by using indoor experimental approaches. If a different experimental device will be used every time one experiment is conducted, a large quantity of time, human labor and materials will be consumed, resulting in wastes of resources and time. Thus, it is required to perform further improvement for the existing similar material simulation experiment device.

SUMMARY

To solve the problem that the fault formation simulation experiment device cannot simulate a normal fault and a reverse fault simultaneously nor control a fault angle and a fracture initiation position, the present disclosure provides a coal measures fault formation simulation experiment device and a normal and reverse fault simulation experiment method, which will be detailed below.

The coal measures fault formation simulation experiment device includes a base, a column, a top beam and a baffle plate. Both ends of the base are provided with columns, baffle plates are disposed on the base between the columns, the top ends of the columns are connected through the top beam and an experimental body is placed between the baffle plates. The device further includes a hydraulic lifting apparatus, a lower angle adjusting apparatus, a push rod apparatus, an upper loading apparatus, an upper angle adjusting apparatus, a lateral loading apparatus and a transparent side plate. The hydraulic lifting apparatus is disposed on the base and connected with the base and the experimental body. The lower angle adjusting apparatus is disposed adjacent to the hydraulic lifting apparatus, the push rod apparatus is connected with the lower angle adjusting apparatus and the column. The upper loading apparatus is disposed between the top beam and the upper angle adjusting apparatus, and the upper angle adjusting apparatus is connected with an upper portion of the baffle plate. The lateral loading apparatus is pressed onto an end face of the experimental body, and the transparent side plate is disposed at a rear side surface of the experimental body.

Preferably, the lateral loading apparatus includes a loading oil cylinder and a side sliding plate, a pressure head of the loading oil cylinder passes through the baffle plate and connects with the side sliding plate and the side sliding plate is pressed onto a side end face of the experimental body.

More preferably, the side sliding plate and the pressure head are connected through a sliding rail and the side sliding plate slides up and down along the pressure head.

More preferably, the hydraulic lifting apparatus includes a sliding block, a hydraulic cylinder, and a sliding baffle plate. The experimental body is placed above the sliding baffle plate, the sliding block moves along the sliding rail on the base, the hydraulic cylinder is fixed above the sliding block, and the hydraulic cylinder is connected with the sliding baffle plate.

More preferably, the lower angle adjusting apparatus includes an inclined plate, telescoping rod, and a lower baffle plate. The lower baffle plate is adjacent to the sliding baffle plate, the inclined plate is hinged with an end of the lower baffle plate, and both ends of the telescoping rod are hinged with the inclined plate and the lower baffle plate respectively.

More preferably, the upper angle adjusting apparatus includes a pressurizing plate, an inclined push plate, an upper baffle plate, an angle adjusting push rod, and a telescoping push rod. An end of the pressurizing plate is provided with a pulley, the angle adjusting push rod adjusts an angle of inclination of the inclined push plate and an end of the telescoping push rod is fixed on the baffle plate.

The normal fault simulation experiment method is performed with the above coal measures fault formation simulation experiment device and includes the following steps.

At step A, a fracture initiation position of a normal fault is determined and the push rod apparatus pushes an end of the lower baffle plate to the fracture initiation position.

At step B, a dip angle of the fault is determined, and an angle between the inclined plate and the lower baffle plate is adjusted to be complementary to the dip angle of the fault.

At step C, the hydraulic lifting apparatus adjusts a position and a height of the hydraulic cylinder to lift the sliding baffle plate to be flush and in contact with the lower baffle plate.

At step D, a length of the experimental body is determined, baffle plates on both ends of the experimental body are fixed and the transparent side plate at the rear side surface of the experimental body is fixed at the same time.

At step E, front baffle plates in front of the experimental body are fixed layer by layer from bottom to top, similar materials are paved layer by layer and stress sensors are laid layer by layer between simulation coal rock layers.

At step F, the upper angle adjusting apparatus is installed, and an included angle of the inclined push plate and the upper baffle plate is made to be equal to the dip angle of the fault by adjusting the angle adjusting push rod.

At step G, the upper loading apparatus applies a load to form a normal fault while the formation process of the normal fault is observed.

The reverse fault simulation experiment method is performed with the above coal measures fault formation simulation experiment device and includes the following steps.

At step A, the hydraulic lifting apparatus adjusts a position and a height of the hydraulic cylinder to lift the sliding baffle plate to be flush and in contact with the lower baffle plate.

At step B, a dip angle of the fault and a fracture initiation position of the fault are determined, and a fault-inducing experimental block is fixedly installed at the fracture initiation point.

At step C, a length of the experimental body is determined, baffle plates on both ends of the experimental body are fixed and the transparent side plate at the rear side surface of the experimental body is fixed at the same time.

At step D, front baffle plates in front of the experimental body are fixed layer by layer from bottom to top, similar materials are paved layer by layer and stress sensors are laid layer by layer between simulation coal rock layers.

At step E, the lateral loading apparatus applies a load to form a reverse fault while the formation process of the reverse fault is observed.

More preferably, after the normal fault is formed, the front baffle plates at the positions of simulation coal seam and roof and floor layers are removed, and then the simulation coal seam is excavated to simulate the mining-induced disaster mechanism at the normal fault.

More preferably, a base angle of the fault-inducing experimental block is equal to the dip angle of the fault. After the reverse fault is formed, front baffle plates at the positions of the simulation coal seam and the roof and floor layers are removed, and then the simulation coal seam is excavated to simulate mining-induced disaster mechanism at the reverse fault.

The present disclosure has the following beneficial effects.

(1) The coal measures fault formation simulation experiment device according to the present disclosure may simulate the formation process of the fault in the coal measures stratum through the hydraulic lifting apparatus, the lower angle adjusting apparatus, the push rod apparatus, the upper loading apparatus, the upper angle adjusting apparatus and the lateral loading apparatus. With the same simulation experiment device, the normal fault and the reverse fault can be simulated. Further, adjustment to the dip angle of the fault and the position of the fault can be achieved by using the lower angle adjusting apparatus and the upper angle adjusting apparatus.

(2) The loading oil cylinder of the lateral loading apparatus passes through the baffle plate and acts on the side sliding plate so that the side sliding plate is moved to form the reverse fault. Further, the lateral sliding plate of the lateral loading apparatus is connected with the pressure head through a sliding rail to ensure a hanging wall and a foot wall of the simulation fault of the experimental body move up and down during the fault formation process. The hydraulic lifting apparatus moves along the sliding rail on the base along with the sliding block, so that pressurizing position can be adjusted in real time. The upper angle adjusting apparatus and the lower angle adjusting apparatus are adjusted to be at the same angle to form a fault with a given angle.

(3) In the method of performing experiment with the device, the fault formation process of the coal measures stratum may be reproduced and the normal and reverse fault formation simulation experiment can be completed in one device, simplifying operation and increasing efficiency. With the upper and lower angle adjusting apparatuses and the fault-inducing experimental block, flexible adjustment to the dip angle of the fault and the fracture initiation position of the fault can be achieved, which solves the defect that fault simulation can only be performed in a single tectonic environment. Simulation excavation of the coal seam can be performed after the fault is formed, which is significant for studying mining-induced disaster mechanism under tectonic stress, safe near-fault coal excavation and disaster prevention and control.

Numerals of drawings are described as follows:

1—base, 2—column, 3—top beam, 4—baffle plate, 5—hydraulic lifting apparatus, 51—sliding block, 52—hydraulic cylinder, 53—sliding baffle plate, 6—lower angle adjusting apparatus, 61—inclined plate, 62—telescoping rod, 63—lower baffle plate, 7—push rod apparatus, 8—upper loading apparatus, 9—upper angle adjusting apparatus, 91—pressurizing plate, 92—inclined push plate, 93—upper baffle plate, 94—angle adjusting push rod, 95—telescoping push rod, 10—lateral loading apparatus, 11—loading oil cylinder, 12—side sliding plate, 13—transparent side plate, 14—experimental body, 15—fault-inducing experimental block, 16—simulated coal seam and 17—top floor layer.

DETAILED DESCRIPTION OF THE EMBODIMENTS

Figure 1:
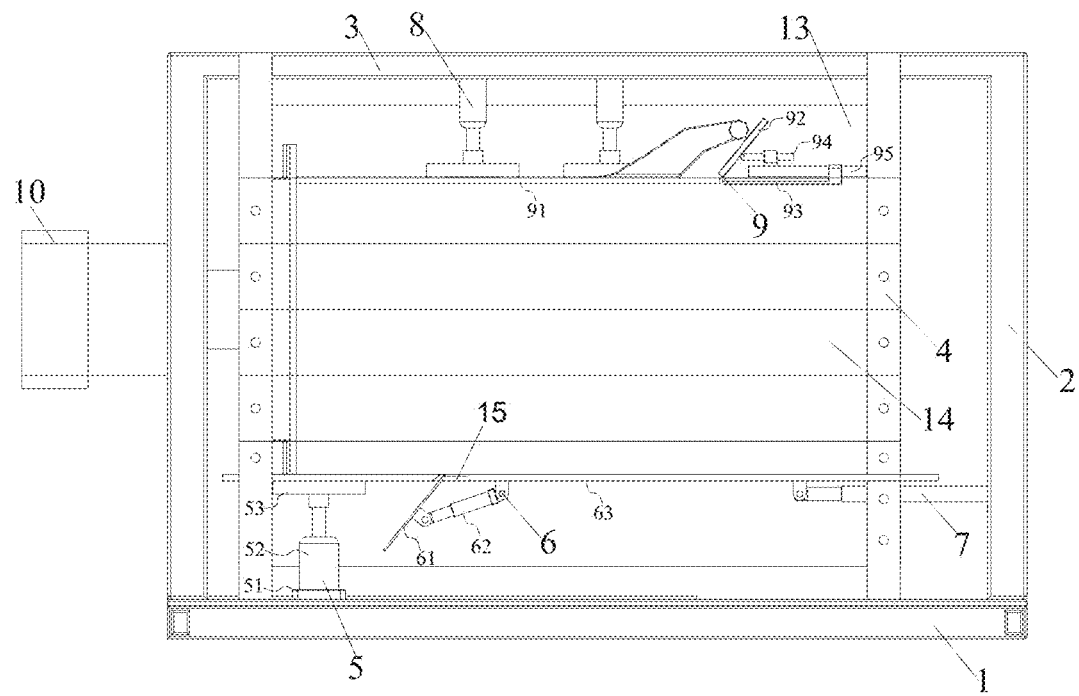
FIG. 1 is a schematic diagram of a structure of a coal measures fault formation simulation experiment device.
Figure 2:
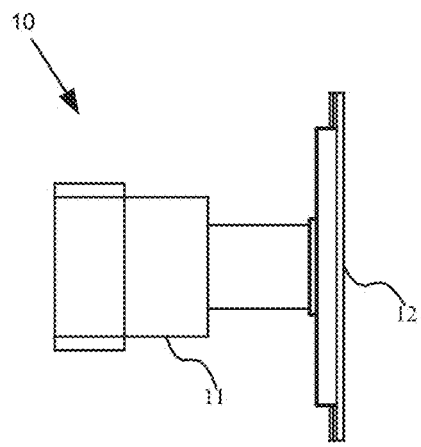
FIG. 2 is a schematic diagram of a structure of a lateral loading apparatus.
Figure 3:
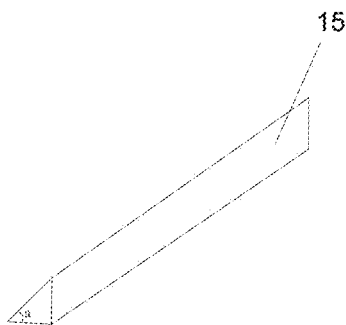
FIG. 3 is a schematic diagram of a fault-inducing experimental block.
Figure 4:
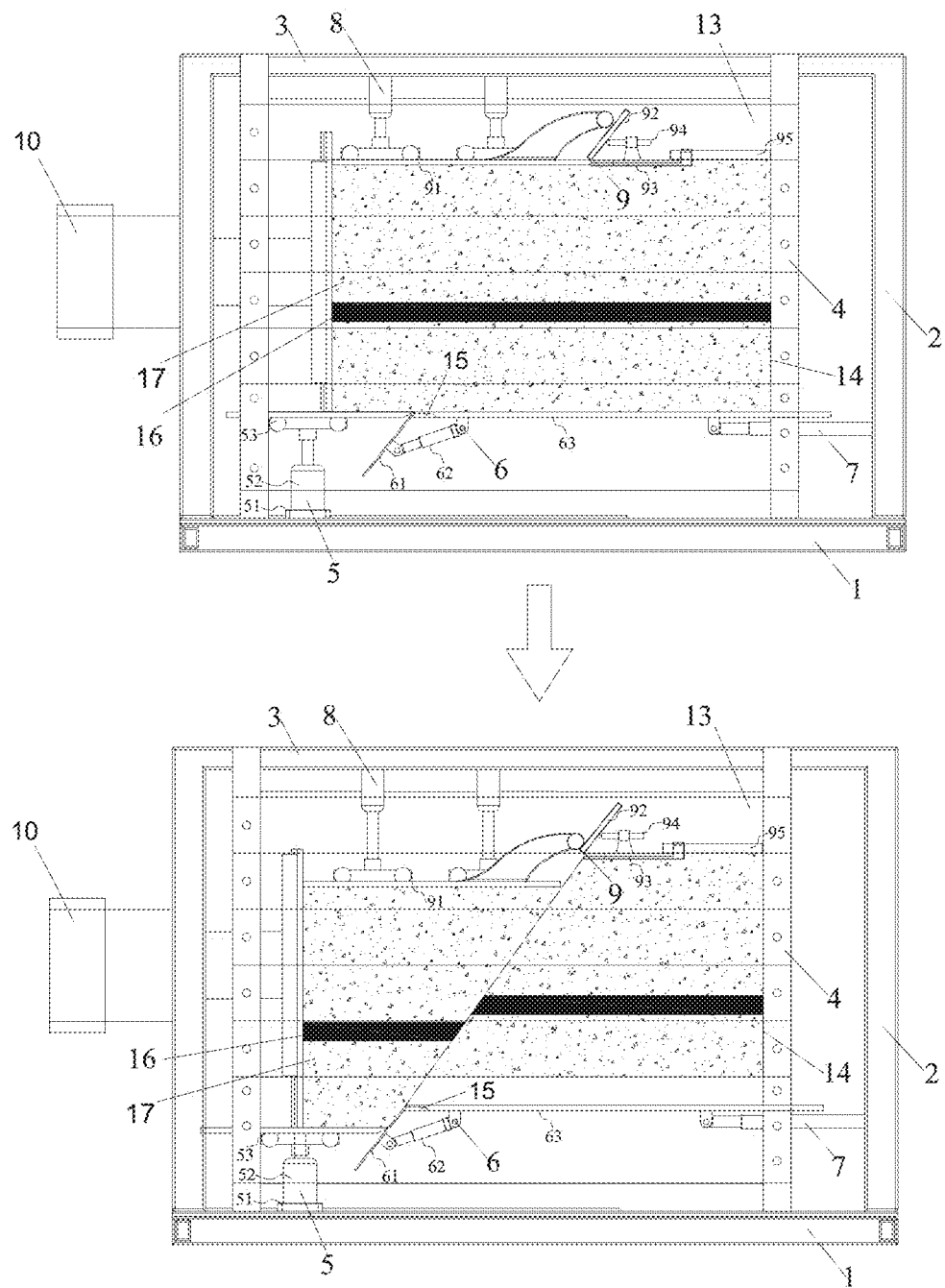
FIG. 4 is a schematic diagram of a simulation normal fault formation process.
Figure 5:
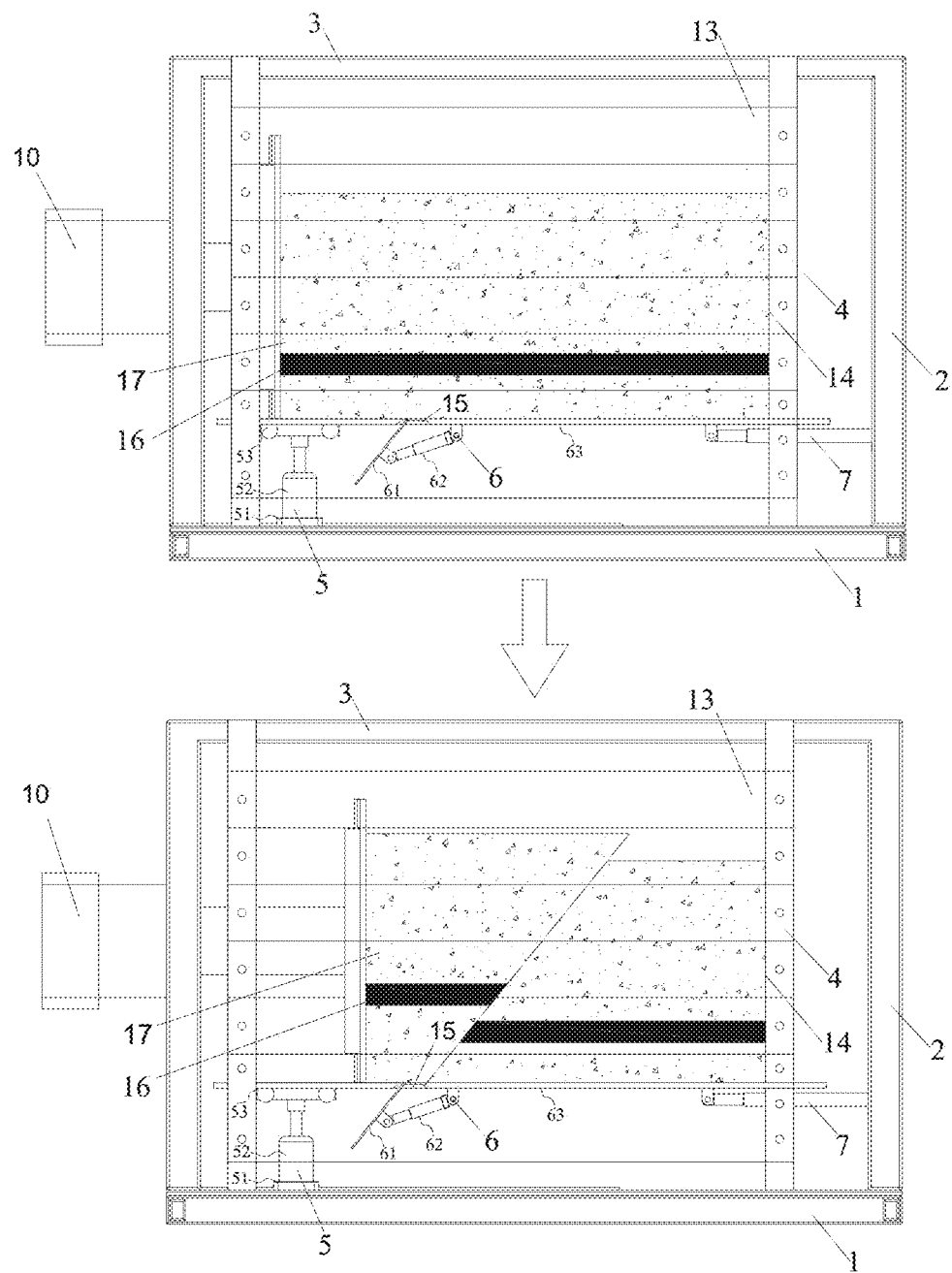
FIG. 5 is a schematic diagram of a simulation reverse fault formation process.

As shown in FIGS. 1-5, the present disclosure provides a coal measures fault formation simulation experiment device and a normal and reverse fault simulation experiment method, which are detailed below in the following examples.

A coal measures fault formation simulation experiment device specifically includes a base 1, a column 2, a top beam 3, and a baffle plate 4. Both ends of the base 1 are provided with columns 2, baffle plates 4 are disposed on the base 1 between the columns, top ends of the columns 2 are connected through the top beam 3, and an experimental body is placed between the baffle plates 4. Further, the experimental device includes a hydraulic lifting apparatus 5, a lower angle adjusting apparatus 6, a push rod apparatus 7, an upper loading apparatus 8, an upper angle adjusting apparatus 9, a lateral loading apparatus 10 and a transparent side plate 13. The hydraulic lifting apparatus 5 moves up and down to adapt to a height change of a side of the experimental body during a normal fault formation process, the lower angle adjusting apparatus 6 is disposed at a given angle to ensure consistency of a dip angle of the fault, the push rod apparatus 7 is used to adjust the position of the fault, the upper loading apparatus 8 loads at the time of formation of the normal fault, the upper angle adjusting apparatus 9 controls a fracture initiation position and a facture initiation angle of an upper surface of the experimental body, the lateral loading apparatus 10 facilitates simulation of the reverse fault, and the transparent side plate 13 facilitates observing the formation process of the fault. The formation process of the fault in the coal measures stratum may be simulated through the hydraulic lifting apparatus 5, the lower angle adjusting apparatus 6, the push rod apparatus 7, the upper loading apparatus 8, the upper angle adjusting apparatus 9 and the lateral loading apparatus 10. With the same simulation experiment device, the normal fault and the reverse fault can be simulated. Further, adjustment to the dip angle of the fault and the position of the fault can be achieved by using the lower angle adjusting apparatus and the upper angle adjusting apparatus.

The hydraulic lifting apparatus 5 is disposed on the base 1 and connected with the base 1 and the experimental body 14 to control the fracture initiation position and bear the weight of the experimental body. Specifically, the hydraulic lifting apparatus 5 includes a sliding block 51, a hydraulic cylinder 52 and a sliding baffle plate 53. The experimental body 14 is placed above the sliding baffle plate 53, the sliding block 51 moves along a sliding rail on the base 1, and the hydraulic cylinder 52 is fixed above the sliding block 51, the hydraulic cylinder 52 is connected with the sliding baffle plate 53, and the sliding block 51 drives the hydraulic cylinder 52 to move along the sliding rail. The hydraulic lifting apparatus 5 moves along the sliding rail on the base 1 along with the sliding block 51, thereby adjusting pressurizing position in real time.

The lower angle adjusting apparatus 6 is disposed adjacent to the hydraulic lifting apparatus 5, the push rod apparatus 7 is connected with the lower angle adjusting apparatus 6 and the column 2. Specifically, the lower angle adjusting apparatus 6 includes an inclined plate 61, a telescoping rod 62, and a lower baffle plate 63. The lower baffle plate 6 is adjacent to the sliding baffle plate 53, the inclined plate 51 is hinged with an end of the lower baffle plate 63, both ends of the telescoping rod 62 is hinged with the inclined plate 61 and the lower baffle plate 63 respectively. The push rod apparatus 7 is connected to the lower baffle plate 63 of the lower angle adjusting apparatus, one side of the lower baffle plate 63 is snap-fitted into a groove on the transparent side plate 13, and the push rod apparatus telescopes to drive the lower baffle plate 63 to change position.

The upper loading apparatus 9 is disposed between the top beam 3 and the upper angle adjusting apparatus 9 and may be fixed on the top beam 3 with 2-3 hydraulic cylinders disposed, and the upper angle adjusting apparatus 9 is connected with an upper portion of the baffle plate 4. The upper angle adjusting apparatus 9 specifically includes a pressurizing plate 91, an inclined push plate 92, an upper baffle plate 93, an angle adjusting push rod 94 and a telescoping push rod 95, an end of the pressurizing plate 91 is provided with a pulley, the pulley is pressed onto the inclined push rod 92, the inclined push plate 92 is hinged with the upper baffle plate 93, the angle adjusting push rod 94 adjusts an inclination angle of the inclined push plate 92, the angle adjusting push rod 94 changes an angle between the inclined push plate 92 and the upper baffle plate 93 through a screw telescoping length, an end of the telescoping push rod 95 is fixed on the baffle plate 4, the telescoping push rod 95 drives the upper baffle plate to move through a screw mechanism. The upper angle adjusting apparatus 9 and the lower angle adjusting apparatus 6 are adjusted to be at the same angle to form a fault with a given angle.

The lateral loading apparatus 10 is pressed onto an end face of the experimental body 14 and the transparent side plate 13 is disposed on a rear side surface of the experimental body 14. The lateral loading apparatus 10 includes a loading oil cylinder 11 and a side sliding plate 12. A pressure head of the loading oil cylinder 11 passes through the baffle plate 4 and connects with the side sliding plate 12, and the side sliding plate 12 is pressed onto the side end face of the experimental body 14. The side sliding plate 12 is connected with the pressure head through a sliding rail, and the side sliding plate 12 slides along the pressure head to ensure the movement of a hanging wall and a foot wall after formation of the fault. The loading oil cylinder 11 of the lateral loading apparatus 10 passes through the baffle plate and acts on the side sliding plate 12 so that the side sliding plate is moved to form a reverse fault. Further, the side sliding plate 12 and the pressure head of the lateral loading apparatus 10 are connected through the sliding rail to ensure the hanging wall and the foot wall of the simulation fault of the experimental body can move up and down during the fault formation process.

To further describe the structure and the use method of the coal measures fault formation simulation experiment device, there are provided a normal fault simulation experiment method and a reverse fault simulation experiment method.

The normal fault simulation experiment method is performed with the above coal measures fault formation simulation experiment device. The experimental device includes a base 1, a column 2, a top beam 3 and a baffle plate 4, a hydraulic lifting apparatus 5, a lower angle adjusting apparatus 6, a push rod apparatus 7, an upper loading apparatus 8, an upper angle adjusting apparatus 9, a lateral loading apparatus 10 and a transparent side plate 13. Both ends of the base 1 are provided with columns 2, baffle plates 4 are disposed on the base between the columns 2, the top ends of the columns 2 are connected through the top beam and an experimental body is placed between the baffle plates 4. The hydraulic lifting apparatus 5 is disposed on the base 1 and connected with the base 1 and the experimental body 14. The lower angle adjusting apparatus 6 is disposed adjacent to the hydraulic lifting apparatus 5, the push rod apparatus 7 is connected with the lower angle adjusting apparatus 6 and the column 2. The upper loading apparatus 8 is disposed between the top beam and the upper angle adjusting apparatus 9, and the upper angle adjusting apparatus 9 is connected with an upper portion of the baffle plate 4. The lateral loading apparatus 10 is pressed onto an end face of the experimental body 14, and the transparent side plate 13 is disposed at a rear side surface of the experimental body.

The specific experimental steps are described below.

At step A, a fracture initiation position of a normal fault is determined, and the push rod apparatus pushes an end of the lower baffle plate to the fracture initiation position.

At step B, a dip angle of the fault is determined and an angle between the inclined plate and the lower baffle plate is adjusted to be complementary to the dip angle of the fault.

At step C, the hydraulic lifting apparatus adjusts a position and a height of the hydraulic cylinder to lift the sliding baffle plate to be flush and in contact with the lower baffle plate.

At step D, a length of the experimental body is determined, baffle plates on both ends of the experimental body are fixed and the transparent side plate at the rear side surface of the experimental body is fixed at the same time.

At step E, front baffle plates in front of the experimental body are fixed layer by layer from bottom to top, similar materials are paved layer by layer and stress sensors are laid layer by layer between simulation coal rock layers, where the stress sensors are densely laid especially near the fault and at the positions of simulation coal seam and roof and floor layers.

At step F, the upper angle adjusting apparatus is installed, an included angle between the inclined push plate and the upper baffle plate is made to be equal to the dip angle of the fault by adjusting the angle adjusting push rod.

At step G, the upper loading apparatus applies a load to form a normal fault while the formation process of the normal fault is observed.

After the normal fault is formed, the front baffle plates at the positions of simulation coal seam and roof and floor layers are removed, and then the simulation coal seam is excavated to simulate the mining-induced disaster mechanism at the normal fault.

The reverse fault simulation experiment method is performed with the above coal measures fault formation simulation experiment device. The experimental device includes a base 1, a column 2, a top beam 3 and a baffle plate 4, a hydraulic lifting apparatus 5, a lower angle adjusting apparatus 6, a push rod apparatus 7, a fault-inducing experimental block 15, a lateral loading apparatus 10 and a transparent side plate 13. Both ends of the base 1 are provided with columns 2, baffle plates 4 are disposed on the base between the columns 2, the top ends of the columns 2 are connected through the top beam and an experimental body is placed between the baffle plates 4. The hydraulic lifting apparatus 5 is disposed on the base 1 and connected with the base 1 and the experimental body 14. The lower angle adjusting apparatus 6 is disposed adjacent to the hydraulic lifting apparatus 5, the push rod apparatus 7 is connected with the lower angle adjusting apparatus 6 and the column 2. The fault-inducing experimental block 15 is disposed above the lower angle adjusting apparatus 6. The lateral loading apparatus 10 is pressed onto an end face of the experimental body 14, and the transparent side plate 13 is disposed at a rear side surface of the experimental body 14.

The specific experimental steps are described below.

At step A, the hydraulic lifting apparatus adjusts a position and a height of the hydraulic cylinder to lift the sliding baffle plate to be flush and in contact with the lower baffle plate.

At step B, a dip angle of the fault and a fracture initiation position of the fault are determined and the fault-inducing experimental block is fixedly installed at the fracture initiation point.

At step C, a length of the experimental body is determined, baffle plates on both ends of the experimental body are fixed and the transparent side plate at the rear side surface of the experimental body is fixed at the same time.

At step D, front baffle plates in front of the experimental body are fixed layer by layer from bottom to top, similar materials are paved layer by layer and stress sensors are laid layer by layer between simulation coal rock layers, where the stress sensors are densely laid especially near the fault and at the positions of simulation coal seam and roof and floor layers.

At step E, the lateral loading apparatus applies a load to form a reverse fault while the formation process of the reverse fault is observed.

A base angle of the fault-inducing experimental block is equal to the dip angle of the fault, the fault-inducing experimental block is of triangular prism and the length of the fault-inducing experimental block is equal to the width of the experimental body. Further, a plurality of fault-inducing experimental blocks with different base angles may be disposed. The block is to be changed when a fault with a corresponding dip angle is prepared. After the reverse fault is formed, front baffle plates at the positions of simulation coal seam and roof and floor layers are removed and then the simulation coal seam is excavated to simulate a disaster-inducing mechanism of mining-induced geological disaster at the reverse fault.

In the above experimental method, the fault formation process of the coal measures stratum may be reproduced and the normal and reverse fault formation simulation experiment can be completed in one device, simplifying operation and increasing efficiency. With the upper and lower angle adjusting apparatuses and the fault-inducing experimental block, flexible adjustment to the dip angle of the fault and the fracture initiation position of the fault can be achieved, which solves the defect that fault simulation can only be performed in a single tectonic environment. Simulation excavation of the coal seam can be performed after the fault is formed, which is significant for studying mining-induced disaster mechanism under tectonic stress, safe near-fault coal excavation and disaster prevention and control.

Of course, the above descriptions are not intended to limit the present disclosure and the present disclosure is also not limited to the above examples. Changes, modifications, addition and substitutions made by those skilled in the art within the essential scope of the present disclosure shall all fall within the scope of protection of the present disclosure.

The invention claimed is:

1. A coal measures fault formation simulation experiment device, comprising a base, a column, a top beam and a baffle plurality of plates, a hydraulic lifting apparatus, a lower angle adjusting apparatus, a push rod apparatus, an upper loading apparatus, an upper angle adjusting apparatus, a lateral loading apparatus and a transparent side plate, wherein both ends of the base are provided with columns, the plurality of baffle plates are disposed on the base between the columns, top ends of the columns are connected through the top beam and an experimental body is placed between the plurality of baffle plates, the hydraulic lifting apparatus is disposed on the base and connected with the base and the experimental body, the lower angle adjusting apparatus is disposed adjacent to the hydraulic lifting apparatus, the push rod apparatus is connected with the lower angle adjusting apparatus and the column, the upper loading apparatus is disposed between the top beam and the upper angle adjusting apparatus, and the upper angle adjusting apparatus is connected with an upper portion of each of the plurality of baffle plates, the lateral loading apparatus is pressed onto an end face of the experimental body, and the transparent side plate is disposed at a rear side surface of the experimental body, the hydraulic lifting apparatus comprises a sliding block, a hydraulic cylinder, and a sliding baffle plate, the experimental body is placed above the sliding baffle plate, the sliding block moves along a sliding rail on the base, the hydraulic cylinder is fixed above the sliding block and the hydraulic cylinder is connected with the sliding baffle plate;

the lower angle adjusting apparatus comprises an inclined plate, a telescoping rod and a lower baffle plate, the lower baffle plate is adjacent to the sliding baffle plate, the inclined plate is hinged with an end of the lower baffle plate, both ends of the telescoping rod are hinged with the inclined plate and the lower baffle plate respectively; the upper angle adjusting apparatus comprises a pressurizing plate, an inclined push plate, an upper baffle plate, an angle adjusting push rod, and a telescoping push rod, an end of the pressurizing plate is provided with a pulley, the angle adjusting push rod adjusts an inclination angle of the inclined push plate and an end of the telescoping push rod is fixed to the plurality of baffle plates.

2. The coal measures fault formation simulation experiment device according to claim 1, wherein the lateral loading apparatus comprises a loading oil cylinder and a side sliding plate, a pressure head of the loading oil cylinder passes through the plurality of baffle plates and connects with the side sliding plate and the side sliding plate is pressed on a side end face of the experimental body.

3. The coal measures fault formation simulation experiment device according to claim 2, wherein the side sliding plate is connected with the pressure head through a sliding rail and the side sliding plate slides up and down along the pressure head.

4. A normal fault simulation experiment method, performed with the coal measures fault formation simulation experiment device according to claim 1, comprising:
at step A, determining a fracture initiation position of a normal fault, wherein the push rod apparatus pushes an end of the lower baffle plate to the fracture initiation position;
at step B, determining a dip angle of the fault and adjusting an angle between the inclined plate and the lower baffle plate to be complementary to the dip angle of the fault;
at step C, adjusting, by the hydraulic lifting apparatus, a position and a height of the hydraulic cylinder to lift the sliding baffle plate to be flush and in contact with the lower baffle plate;
at step D, determining a length of experimental body, fixing baffle plates on both ends of the experimental body and fixing the transparent side plate at the rear side surface of the experimental body at the same time;
at step E, fixing front baffle plates in front of the experimental body layer by layer from bottom to top, paving similar materials layer by layer, and laying stress sensors layer by layer between simulation coal rock layers;
at step F, installing the upper angle adjusting apparatus, and making an included angle between the inclined push plate and the upper baffle plate equal to the dip angle of the fault by adjusting the angle adjusting push rod; and
at step G, applying, by the upper loading apparatus, a load to form the normal fault while observing the formation process of the normal fault.

5. A reverse fault simulation experiment method, performed with the coal measures fault formation simulation experiment device according to claim 1, comprising:
at step A, adjusting, by the hydraulic lifting apparatus, a position and a height of the hydraulic cylinder to lift the sliding baffle plate to be flush and in contact with the lower baffle plate;
at step B, determining a dip angle of a fault and a fracture initiation position of the fault and fixedly installing a fault-inducing experimental block at the fracture initiation position;
at step C, determining a length of the experimental body, fixing baffle plates on both ends of the experimental body, and fixing the transparent side plate at the rear side surface of the experimental body at the same time;
at step D, fixing front baffle plate in front of the experimental body layer by layer from bottom to top, paving similar materials layer by layer and laying stress sensors layer by layer between simulation coal rock layers; and
at step E, applying, by the lateral loading apparatus, a load to form a reverse fault while observing the formation process of the reverse fault.

6. The normal fault simulation experiment method according to claim 4, wherein after the normal fault is formed, front baffle plates at the positions of the simulation coal seam and roof and floor layers are removed, and then the simulation coal seam is excavated to simulate a mining-induced disaster mechanism at the normal fault.

7. The reverse fault simulation experiment method according to claim 5, wherein a base angle of the fault-inducing experimental block is equal to the dip angle of the fault; after the reverse fault is formed, front baffle plates at the positions of simulation coal seam and roof and floor layers are removed and then the simulation coal seam is excavated to simulate a mining-induced disaster mechanism at the reverse fault.

* * * * *